United States Patent [19]

Vos et al.

[11] 4,304,989
[45] Dec. 8, 1981

[54] DIGITAL CONTROL SYSTEM

[76] Inventors: H. Johannes Vos, 1540 29th St. NW., Calgary, Alberta, Canada, T2N 4L7; James D. VanWert, 11810 Macleod Trail South, Apt. 108, Calgary, Alberta, Canada, T2J 2V8

[21] Appl. No.: 72,595

[22] Filed: Sep. 5, 1979

[51] Int. Cl.³ ............................................. G06M 3/02
[52] U.S. Cl. ............................ 235/92 CT; 137/624.2; 235/92 T; 235/92 CC; 235/92 FL; 239/63
[58] Field of Search ............ 235/92 CT, 92 T, 92 PE, 235/92 CC, 92 FL; 137/624.2, 624.21; 239/70, 63, 65; 368/10

[56] References Cited

U.S. PATENT DOCUMENTS

| 3,440,434 | 4/1969 | Yates et al. | 137/624.2 |
| 3,869,854 | 3/1975 | Church | 58/33 |
| 3,876,950 | 4/1975 | O'Connor | 235/92 T |
| 4,014,359 | 3/1977 | Sanner | 239/63 |
| 4,016,407 | 4/1977 | Mesecar et al. | 235/92 T |
| 4,080,575 | 3/1978 | Miki | 235/92 T |

Primary Examiner—Joseph M. Thesz
Attorney, Agent, or Firm—William R. Hinds; George H. Dunsmuir

[57] ABSTRACT

A solid state, digital control system is disclosed for individually timing and sequentially operating a number of electrically controllable devices such as remote control valves and pumps for irrigation systems. In one embodiment, the digital control system comprises clock circuits (10) which produce at least two pulses, a first or daily pulse produced at the beginning of a day and a second or alarm pulse produced at a preselected time. The daily pulse is counted by a first counter (20) and the alarm pulse is counted by a second counter (22). A plurality of outputs (24) are individually actuated on successive days by first counter (20) and are selectively applied by controllable switches (131-144) to an inhibit input (32) of second counter (22) whenever the sequential operation of the devices is not desired on a particular day. A plurality of output control circuits (38) are individually connected to the outputs (26) of second counter (22) and controlled by the court therein. Each of the output circuits (38) is connectable to a device to be controlled thereby. Also connected to outputs (26) is control logic (42) that is also responsive to the count in second counter (22). Control logic (42) in turn controls the generation of a pulse by a pulse generator (44) after a selectable time delay that can differ for each device being controlled. The output of a pulse generator (44) is connected to a clock input of second counter (22), thereby changing the count therein. Thus the device controlled by output control circuits (38) is changed after the preselected operation time of the previously controlled device has expired.

6 Claims, 8 Drawing Figures

DIGITAL CONTROL SYSTEM

FIELD OF THE INVENTION

The present invention relates to the timing and automatic operation and cycling of a plurality of electrically controlled devices, and in particular relates to a solid state, digital control system for individually timing and sequentially operating a number of electrically controllable devices such as remote control valves and pumps for irrigation and humidification systems.

BACKGROUND OF THE INVENTION

In the field of irrigation where repetitive, periodical, timed operation of a water supply system is required there has been a need for an inexpensive, extremely reliable, easily programmable timing and control system. The irrigation system can be used for as varied applications as the repetitive humidification spraying of plants in botanical gardens and hothouses to the supplying of water to large golf courses where the particular amount of water required at particular locations differs depending upon the location.

Of those control systems which are currently in use in the field, almost all of them rely on a mechanical timer. Although the mechanical timers have become quite sophisticated and can provide a plurality of different time sequences in a sequential, predetermined manner, the devices still require the operation of a mechanical, moving switch means. Such switch means are prone to frequent failure as the switch contacts get dirty and worn.

It is also known to use a digital computer operated control system in which a general purpose, digital computer controls the timing functions. Unfortunately, such systems are extremely costly, quite bulky, difficult to maintain, and difficult to program by an operator who has not had extensive training. Furthermore, because of the temperature and humidity conditions in the field, such systems have not been completely reliable. Finally, upon the loss of power, these computer controlled systems lose all their preprogrammed RAM memory and the entire system must be started up from scratch. Naturally, this requires skilled personnel to reprogram the computer with the attendant increased maintenance costs of the system.

SUMMARY OF THE INVENTION

The present invention provides a digital control system for automatically controlling an unlimited number of devices in sequential order at variable, differing operating times. More particularly, the present invention provides an improved solid state, electronic digital control system for automatically programming the operation of electrically actuated devices, such as valves and pumps in irrigation, spraying and humidification systems.

A unique sequence and timing circuit enables zone timing to be programmed and done accurately in and at preselected hours, minutes or seconds, yet to be easily reprogrammable to fit the needs of different applications with little or no circuit changes.

In specific embodiments of the present invention, an indication system is provided to let the operator know the present time, the present day, and the present zone currently being treated. When used with an irrigation system, a specific embodiment provides circuitry for repeat programming so that certain types of landscaping such as newly seeded areas can be treated with short bursts of water at precisely controlled intervals. The unique all digital circuitry of a specific embodiment of the present invention allows the digital control system to function in remote areas having extremes in temperature without damaging the internal parts of the unit or affecting its accuracy.

By using the specific circuitry of presently preferred embodiments, the present invention provides an electronic controller capable of operating an unlimited number of remotely controlled electrical valves and switches. The presently preferred circuitry incorporates component boards providing great ease in servicing and troubleshooting and capable of being stored in an extremely small and lightweight package. Such a circuitry can also be inexpensively manufactured, yet has a long lifetime with an extremely high degree of reliability.

The present invention comprises an electronic controller for remote periodic operation of a plurality of devices. Such a controller comprises a clock circuit means for providing at least a first timing pulse once a day at the same time at a first clock output thereof and a second timing pulse at least once a day at a preselected time at a second clock output. The controller further comprises two counter means for at least respectively counting the first and second timing pulses and for producing an output representative of the count therein. An output control circuit having a plurality of selectable operating circuits, each of which is adapted to control the operation of a corresponding device, is connected to and controlled by the second counter. The second counter means in turn is controlled by a controller means responsive to the counts of the second counter. The controller means produces a time delayed control signal which changes the count in the second counter means.

Other details, features and objects of the present invention will be set forth in, or apparent from the accompanying drawings and detailed description of the preferred embodiments found hereinbelow.

DETAILED DESCRIPTION OF THE PRESENTLY PREFERRED EMBODIMENTS

Figure 1:
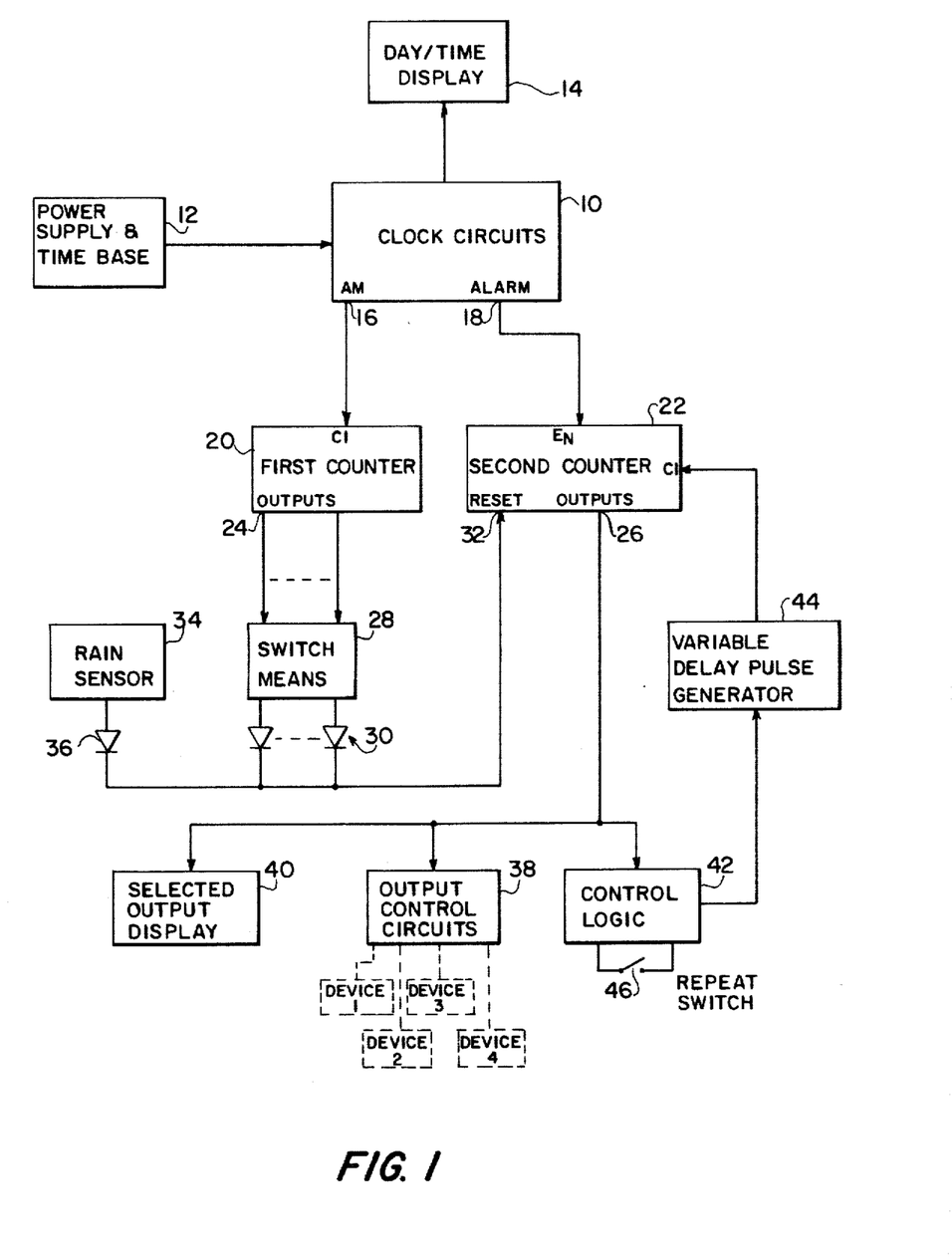
FIG. 1 is an electronic schematic block diagram of a presently preferred embodiment of a digital control system according to the present invention.

With reference now to the figures wherein like numerals represent like elements throughout the several views, and in particular with reference to FIG. 1, there is depicted a generalized digital control system shown in block diagrams. The digital control system is comprised of clock circuits 10 receiving their power and a clock input signal from a power supply and time base 12. Clock circuits 10 have a time and day output that can be indicated on a day/time display 14, a first clock output or AM output 16 for providing a first timing pulse once a day at the same time, preferably midnight, and a second clock output or alarm output 18 for providing a second timing pulse once a day at a preselected time. AM output 16 is connected to the clock input of a first counter 20, and alarm output 18 is connected to an $E_n$ clock input of a second counter 22. First and second counters 20 and 22 have corresponding outputs 24 and 26 for providing a signal representative of the count in the corresponding counter. The output signals from the respective counters can either be in a binary or coded form or can be in a decoded form whereby a single output represents a single value or count.

Connected to outputs 24 of first counter 20 is a switch means 28. The outputs from first counter 20 are preferably decoded and thus switch means 28 has a plurality of switches individual to each output for respectively connecting any output signal from first counter 20 to the output of switch means 28. Each output of switch means 28 is connected to the input of a corresponding diode, the output of which is connected to each of the other diodes and thence connected to a reset input 32 of second counter 22. Diodes 30 prevent feedback and noise from being transferred to other outputs from switch means 28. The output from a rain sensor 34 is also connected to reset input 32 through a corresponding diode 36. Rain sensor 34 provides a reset signal to counter 22 when it detects moisture and is more fully described hereinbelow.

Outputs 26 from second counter 22 are fed in parallel to output control circuits 38 which are adapted to be connected to a plurality of devices to be controlled for controlling the operation thereof, to a selected output display 40 which indicates the selected device being controlled by control circuits 38, and control logic 42 for decoding the output signal from second counter 22 and for operably controlling a variable delay pulse generator 44. Depending upon the input signal to pulse generator 44 from control logic 42, the pulse generator 44 will generate a pulse at the output thereof after a time delay. The output pulse from pulse generator 44 is coupled to a second clock input labelled input Cl. This pulse will cause second counter to count and thus change the output signal at output 26 thereof.

Because of the generalized nature of the digital control system depicted in FIG. 1, it will be instructive in understanding the detailed operation of the specific embodiments of the present invention if the operation of FIG. 1 is explained at this time. The operation will be explained with respect to the use of the present invention for sequentially controlling the operation of four groups of irrigation valves by output control circuits 38.

An operator of the digital control system first sets the alarm output of clock circuits 10 to the particular time of day desired for the commencement of the irrigation cycle or sequence. The operator also closes selected switches in switch means 28 to program the particular days on which the irrigation cycle is to be run. Finally, the operator sets the time delays in control logic 42 for the respective valve groups to determine the amount of time each valve group will be open, and hence the amount of irrigation to be done by that group of valves.

Each day, at midnight, clock circuits 10 provide an output signal at the AM output 16, which in turn clocks first counter 20. Thus, first counter 20 is clocked once each day and in turn activates a corresponding output 24. The output signal from first counter 20 will be delivered to the reset input 32 of second counter 22 if the corresponding switch in switch means 28 has been properly positioned. For exemplary purposes, it will be assumed that when a particular switch in switch means 28 is closed, a signal from the output of first counter 20 will be conveyed to the reset input 32 of second counter 22 thereby preventing any counting of second counter 22. Similarly, second counter 22 will be held in the reset position whenever rain sensor 34 detects any rain. Assuming that switch means 28 has been programmed to permit the operation of the irrigation cycle on the particular day, second counter 22 is in the enabled condition awaiting the first count or input pulse at its clock input from alarm output 18.

As soon as clock circuits 10 reach the alarm time, an output signal from alarm output 18 toggles the count in second counter 22 from the 0 or reset state to a count of 1. A signal representing the count of 1 is coupled from outputs 26 to output control circuits 38 where it is decoded and device 1 is activated. At the same time, output display 40 displays the number 1 to indicate that device 1 has been selected. At this time, irrigation will commence through the opened valves of group 1. The valves of group 1 will remain open for a length of time determined by control logic 42. At the end of this particular time, pulse generator 44 will produce an output pulse to the Cl input of second counter 22, thereby increasing the count to the number "2".

As before, output control circuits 38 will decode the output signal from second counter 22 and turn off the device 1 or group 1 valves and turn on the device 2 or group 2 valves. Output display 40 will indicate the number 2 and control logic 42 will program pulse generator 44 to output yet another pulse at the preselected time delay to terminate the irrigation through the group 2 valves.

The digital control system will continue to operate in this manner until all of the devices have been sequentially operated. After the last device is operated, the count in second counter 22 will either be at the quiescent count or will have been reset by an output from pulse generator 44 depending upon the particular embodiment. If desired, a repeat switch 46 connected to control logic 42 can be closed to commence the sequence all over again after a preselected time delay.

Depending upon the particular application, the amount of time the particular groups of irrigation valves will be open will depend upon the particular location of the areas being irrigated and the particular type of irrigation desired. For example, in greenhouses, it is common to regularly, periodically spray all of the plants in the greenhouse for a short duration of perhaps one minute. This sequence is then usually repeated every few hours throughout the day. In this application, repeat switch 46 will be closed and switch means 28 will be programmed such that irrigation will be accomplished on every day. Obviously, rain sensor 34 will have no application and probably will not be used. On the other hand, if the digital control system is connected up to an irrigation system of a golf course, it can be readily seen that certain areas of the golf course, such as the greens, will require more watering than other areas, such as the fairways. Also, there will be no need to irrigate the golf course when it rains and thus a rain sensor 34 will probably be employed. In this particular irrigation system, those valves controlling the irrigation of the greens will be programmed to be on for a longer time than the valves which control the irrigation of the fairways. The alarm output of clock circuits 10 would probably be set for an early hour, such as 4 A.M., when the golf course is not being used and the repeat switch 46 will be used with a long time delay so that the golf course can be irrigated at night after all of the golfers have departed.

A first detailed embodiment of the present invention will now be described.

Figure 2:
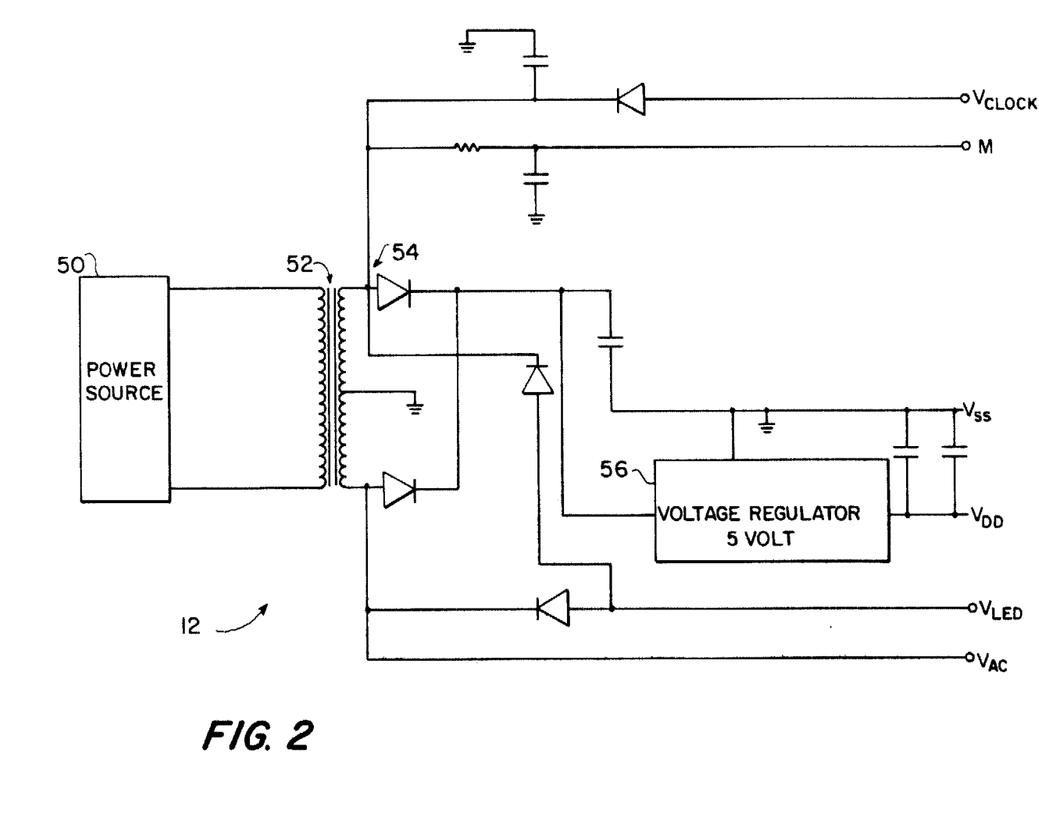
FIG. 2 is an electronic schematic circuit diagram of a power supply shown in block form in FIG. 1.

With reference to FIG. 2, a fairly conventional power supply is depicted for supplying all of the necessary voltages to a digital electronic circuit and to operate the solenoids of the controlled devices such as valves. Power supply 12 receives a source of 50 Hertz or 60 Hertz alternating current (AC) power from a conventional power source 50 such as a generator or household power. A conventional, step down transformer 52 and full wave rectifier 54 supply at least 8 volts to a five volt voltage regulator 56, such as a commercially available 7805 integrated circuit. From voltage regulator 56, ground or $V_{SS}$ and +5 volts or $V_{DD}$ are provided. Two negative voltages, $V_{clock}$ and $V_{led}$ are obtained from transformer 52 through appropriately connected diodes. Finally, power supply 12 provides two AC power sources, a first power source, $V_{AC}$, for operating the controlled devices or valves and a second power source M for providing a 50 Hertz or 60 Hertz input signal to be used as a time base for clock circuits 10.

Figure 3:
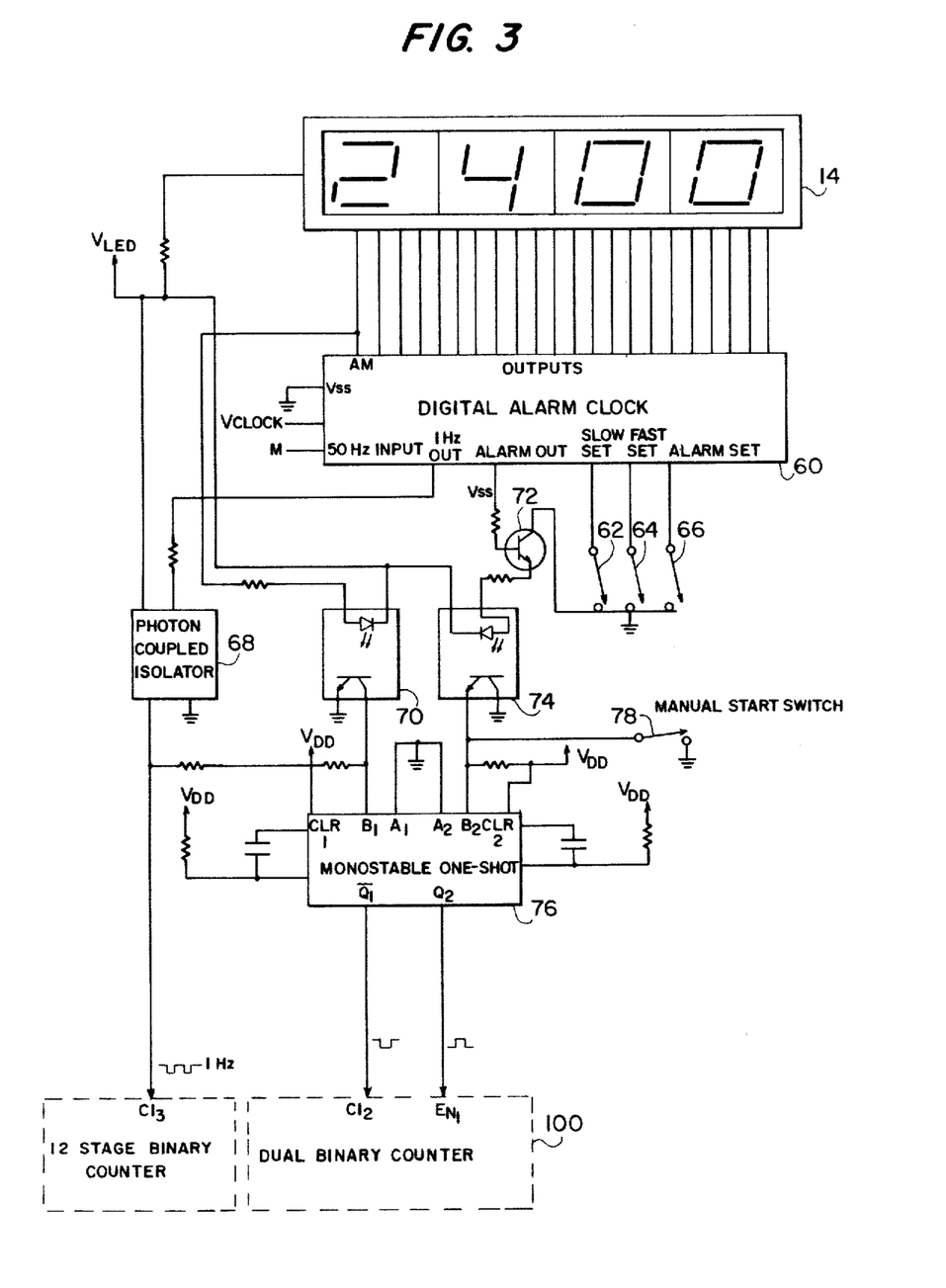
FIG. 3 is an electronic schematic circuit diagram of the clock circuits depicted in block form in FIG. 1.

A presently preferred, digital embodiment of clock circuits 10 according to the present invention is depicted in FIG. 3. Clock circuits 10 are principally comprised of a commercially available, LSI integrated circuit clock device 60, such as IC circuit S1998 manufactured by American Microsystems, Inc. Typically, clock device 60 provides a time output in four digits, tens of hours, hours, tens of minutes, and minutes. In addition, indication of AM or PM can be provided as well as an alarm output signal when the set alarm time has been reached. Finally, a 1 Hertz output signal can be obtained from clock device 60. Three switches, 62, 64, and 66, permit the setting of the time or the setting of the alarm. The AM output and the 1 Hertz output from clock device 60 are directly connected to two identical photon coupled isolators 70 and 68, respectively, and the alarm output is connected through a transistor 72 to a third photon coupled isolator 74. Transistor 72 is used as an amplifier to boost the "alarm out" signal. The other inputs of isolators 68, 70, and 74 are connected to $V_{LED}$. Because the outputs from clock device 60 are active when low, and because $V_{LED}$ is of a negative voltage, the inputs to the isolators are connected as shown in FIG. 3. Typical commercially available photon coupled isolators which can be used for isolators 68, 70 and 74 are the isolator Ser. #4N33 series manufactured by General Electric Company. This type of isolator consists of an infrared emitting diode coupled with a photo-darlington amplifier.

The amplified outputs from isolator 70 and 74 are respectively connected to the inverted or the B inputs of a dual monostable multivibrator 76. Multivibrator 76 is used to provide noise-free, accurately shaped output pulses for subsequent input to respective counters, as described hereinbelow. An exemplary multivibrator is the commercially available CD4528B device manufactured by National Semiconductor.

Because the output from isolator 68 is a 1 Hertz signal and not a single pulse, as is the output from isolators 70 and 74, it is not necessary to further condition the signal before it is fed to a counter used in a second embodiment of the present invention depicted in FIG. 8 and described further hereinbelow.

Optical isolators are used to isolate clock device 60 from the rest of the digital control system primarily because of the high noise and impressed AC signals that commonly occur on the outputs from typical commercially available clock devices. Furthermore, the isolators provide a good DC level and hence nicely shaped pulses. Finally, the isolators prevent any noise and feedback from the rest of the digital control circuit being coupled to clock device 60.

Also provided in clock circuits 10 as depicted in FIG. 3 is a manual start switch 78 connected between ground and the $B_2$ input of multivibrator 76 in parallel with the input thereto from isolator 74. If desired, a conventional debouncing circuit can also be connected between switch 78 and multivibrator 76 to ensure that only a single pulse is delivered thereto. Switch 78 can be a commercially available, normally-open push button switch.

Figure 4:
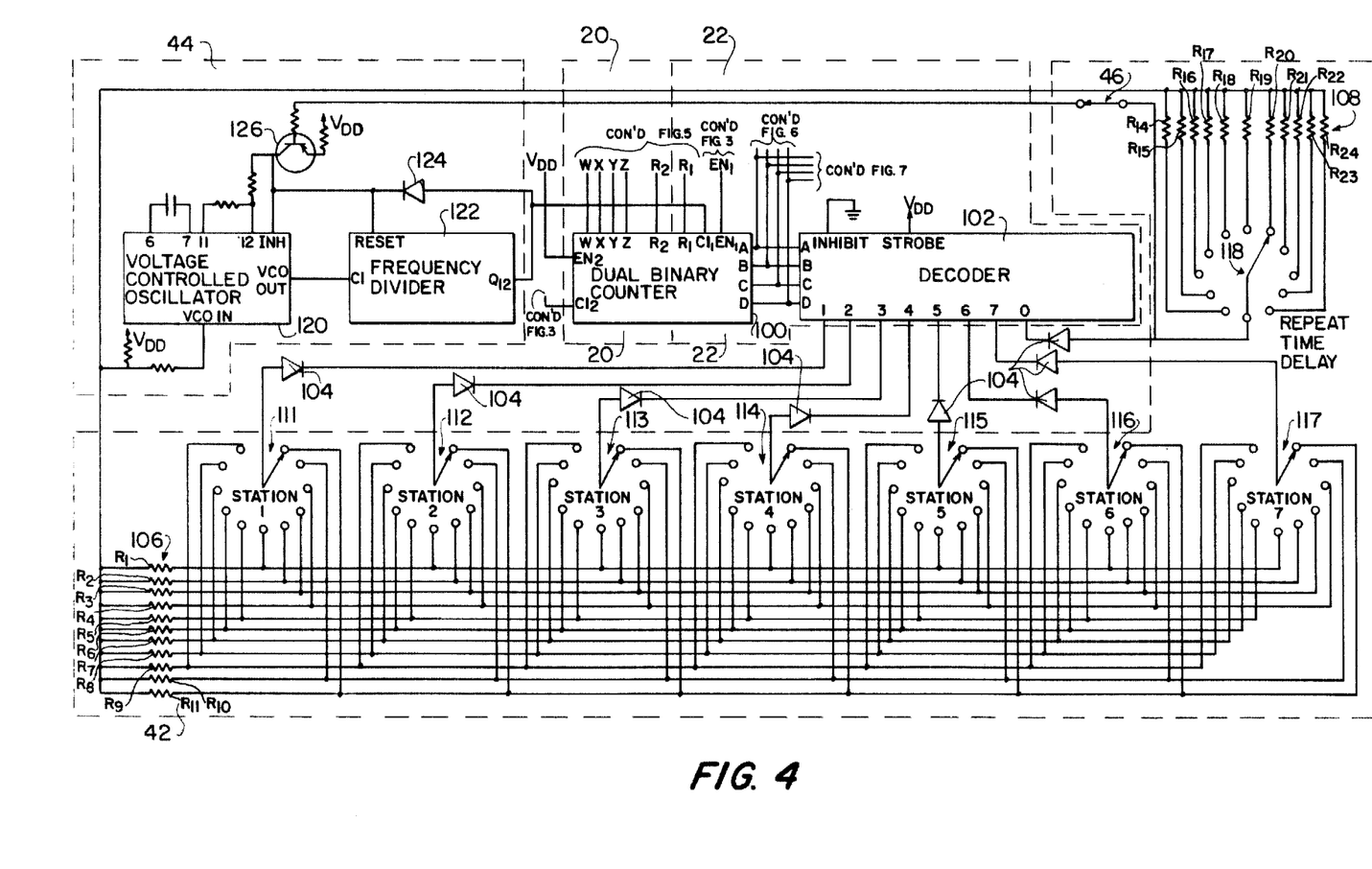
FIG. 4 is an electronic schematic circuit diagram of one embodiment of the control logic and pulse generator together with other circuits depicted in block diagram form in FIG. 1.

With reference to FIG. 4, a first embodiment of control logic 42 and pulse generator 44 is depicted connected to first counter 20 and second counter 26. In this particular embodiment, first and second counters 20 and 22 are respective second and first halves of a commercially available dual binary counter 100 such as a dual synchronous up counter CD4520BM manufactured by National Semiconductor. This type of counter 100 has two identical, independent, synchronous, four-stage counters which increment on either the positive edge of a pulse applied to the CLOCK input or the negative-edge of a pulse applied to the ENABLE input. In addition, each of the two counters can be asynchronously cleared and prevented from counting by a high level input on the RESET line. The outputs from that half of counter 100 that is equivalent to first counter 20 are labelled the WXY and Z outputs. Similarly, the outputs from the other half of the binary counter that is equivalent to second counter 22 are labelled ABC and D. As mentioned above, these outputs, ABC and D are fed to corresponding inputs of a decoder 102 such as a 4 to 16 line decoder/demultiplexer commercially available as device #N74154 from Signetics Corporation. Decoder 102 in a conventional manner decodes the four line binary input into one of sixteen output lines, only eight of which are depicted in FIG. 4. Each of the outputs from decoder 102 are coupled to a corresponding stage of control logic 42 through corresponding diodes 104 to prevent feedback.

Control logic 42 is comprised of a first bank 106 of resistors R1 through R11, a second bank 108 of resistors R14 through R24, seven switches 111 through 117, the outputs of which are connected to corresponding resistors in first resistor bank 106, and an eighth multiposition switch 118 the outputs of which are connected to corresponding resistors in second resistor bank 108.

Switches 111 through 118 are multiposition switches having a single input which is connected to corresponding outputs of decoder 102 and 12 selectable outputs. Obviously, both the number of outputs from each switch and the number of switches depicted in FIG. 4 are only exemplary and any desired number can be used. Should the number of stages of decoder 102 be exceeded, it is possible to daisy-chain a plurality of counters and corresponding plurality of decoders. The outputs from both resistor banks 106 and 108 are tied together and are connected to the input of pulse generator 44.

In this particular embodiment of the invention, pulse generator 44 is comprised of a voltage controlled oscillator 120 having a VCO IN input and a VCO OUT output. Voltage controlled oscillator 120 can be any commercially available circuit such as part of a micropower phase-locked loop device #CD4046BM manufactured by National Semiconductor. Voltage controlled oscillator 120 produces an output signal having a frequency determined by the voltage at the VCO IN input and the values of the capacitor and resistors connected at pins 6, 7, 11 and 12. An inhibit input INH to voltage controlled oscillator 120, when high, disables the oscillator and prevents any pulses being produced at output VCO OUT.

Pulse generator 44 is also comprised of a frequency divider 122, the clock input Cl of which is coupled to the output VCO OUT of voltage controlled oscillator 120. Frequency divider 122 can simply be a commercially available counter, such as a twelve-stage ripple carry binary counter commercially available as device #CD4040BM manufactured by National Semiconductor. Such a counter can be advanced one count on the negative transition of each clock pulse and can be asynchronously reset to the 0 state by the application of a high-level signal at the reset input. The output of the last stage of divider 122, stage $Q_{12}$, is connected to the clock input $Cl_1$ of dual binary counter 100 and to the input of diode 124, the output of which is connected to the RESET input of divider 122 and the INH inhibit input of voltage controlled oscillator 120. Thus, when the output of voltage controlled oscillator 120 has been divided by 1,024, the count in the second binary counter 22 is incremented, the frequency divider 122 is reset, and the output of voltage controlled oscillator 120 is inhibited.

It can thus be seen that decoder 102 selects one of switches 111 through 118 and that the selected switch applies a selected resistance to the input of voltage controlled oscillator 120 to vary the frequency of the output signal. In this manner, the time from the selection of the particular station corresponding to the selected switch 111 through 118 to the incrementing of counter 22 can be varied. Furthermore, it should be apparent that upon the incrementing of counter 22 by a signal from frequency divider 122, the next output of decoder 102 is selected which in turn energizes the next station and starts the process all over again. Voltage controlled oscillator is again permitting to output a frequency of pulses determined by the selected resistance R1 through R11 or R14 through R24, or none of them, when the pulse applied to the INH inhibit input from frequency divider 122 is removed when the same pulse resets frequency divider 122.

Station 8 of the eight depicted stations corresponding to switches 111 through 118 is used to determine the length of a repeat time delay, if selected, between the cessation of operation of station 7 and the recommencement of operation of station 1. A repeat is selected by opening repeat switch 46. With repeat switch 46 in the closed position, as depicted in FIG. 4, the active low signal appearing at the 0 output of decoder 102 is connected to a transistor 126 which in turn is connected to the INH inhibit input of controlled oscillator 120. Thus, as decoder 102 is stepped through its various outputs in a cyclical manner, when the first output, output 0, is selected a high going signal is applied to the INH inhibit input of the voltage controlled oscillator so as to prevent any output therefrom. On the other hand, with repeat switch 46 in the open position, the selection of output 0 of decoder 102 will select switch 118 and the selected resistor will control the frequency output of voltage controlled oscillator 120 to determine the time delay before station 1 is again selected.

Exemplary time delays possible with the circuit depicted in FIG. 4 can vary from substantially no delay to a minimum delay of 1 minute and a maximum delay of one hour for no resistor being selected in either resistor bank 106 or 108 to a minimum resistance of about 5 kilo ohm and a maximum resistance of 9 kilo ohm. The frequency of the output from voltage controlled oscillator 120 will vary from 15 kilohertz when no resistor is selected to one-third Hertz as a minimum frequency and 16 Hertz as a maximum frequency. Obviously, the resistors in the resistor banks could be replaced by a plurality of multiturned variable resistors.

Figure 5:
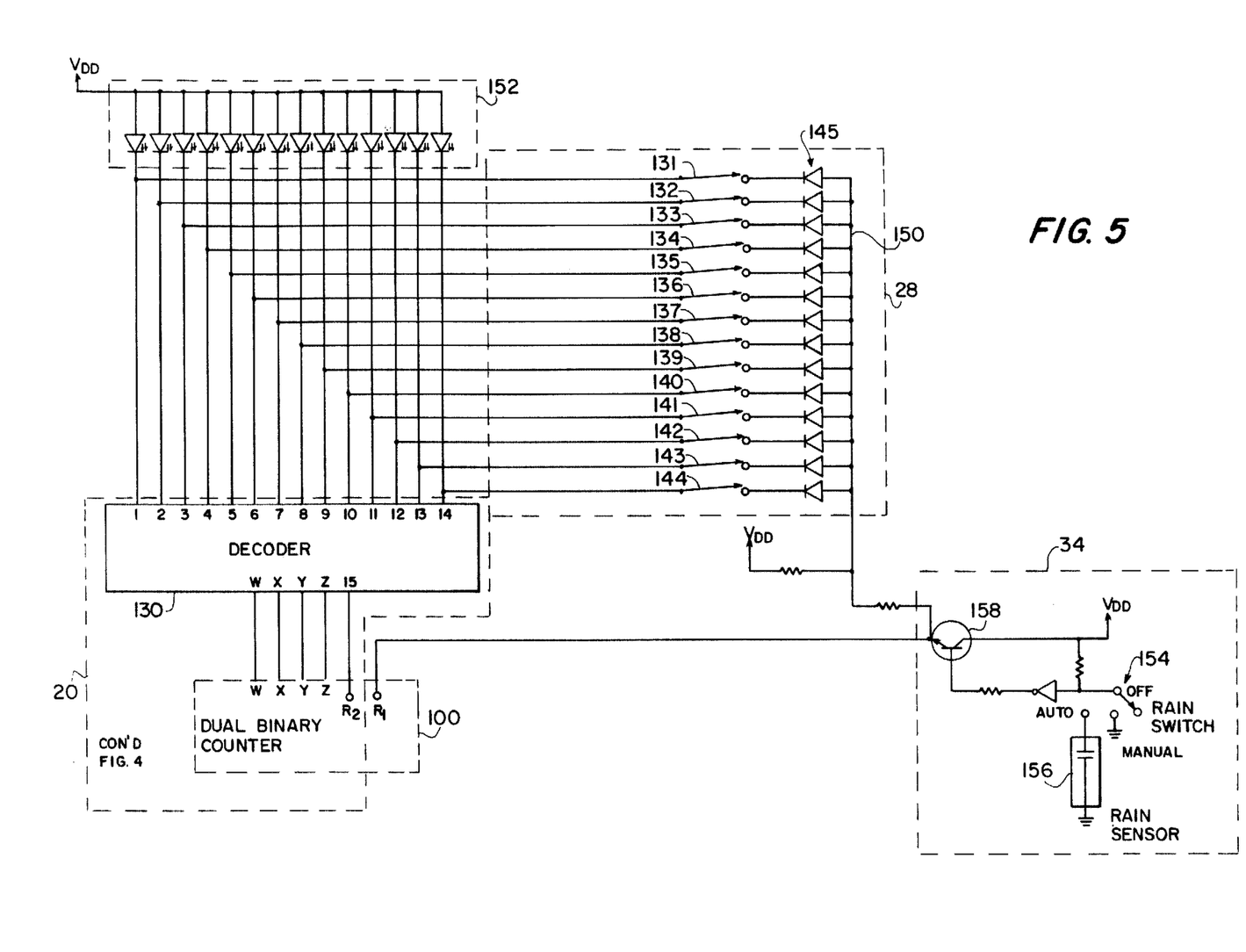
FIG. 5 is an electronic schematic circuit diagram of a switch means and rain sensor depicted in block form in FIG. 1.

With reference now to FIG. 5, first counter 20, switch means 28, and rain sensor 34 are depicted. Outputs WXY and Z from the second half of dual binary counter 100 are connected to a decoder 130. Decoder 130 can be identical to decoder 102 and is depicted with outputs 1 through 14 connected to switch means 28. Output 15 of decoder 130, when selected, is connected to the $R_2$ input of dual binary counter 100 to reset the second half thereof and in turn select output 1 from decoder 130.

Switch means 28 is simply comprised of a plurality of single pole-single throw switches 131 through 144 connected between corresponding outputs of decoder 130 through corresponding diodes 145 to a common line 150. Line 150 in turn is held high through a pull up resistor and is connected through a current limiting resistor to the reset input $R_1$ of dual binary counter 100. As mentioned above, decoder 130 is an active low device which means that a current sink is supplied at the selected output. Thus, for example, when output 1 is selected, a current sink is provided to switch 131. If switch 131 is open, then line 150 is held high with the pull up resistor and a reset signal is supplied to the first half of dual binary counter 100. As should now be obvious, this prevents second counter 22 from counting and as will be described hereinbelow prevents the selection of a particular device by output control circuits 38. On the other hand, if switch 131 is closed when output 1 of decoder 130 is selected, the reset $R_1$ of second counter 22 is tied low and the counter is essentially enabled to count. Because first counter 20 receives one pulse every day, the circuit depicted in FIG. 5 essentially provides a two week calendar of signals.

In order to provide an indication of the selected day by decoder 130, a display 152 comprising 14 LED's connected to corresponding outputs of decoder 130 is provided. This then permits the operator to know the particular day being selected by decoder 130.

Rain sensor 34 simply comprises a single pole triple throw rain switch 154, a commercially available moisture sensor 156 and a transistor switch 158 which is operated by a signal produced at the output of rain switch 154. When turned on, transistor switch 158 provides a positive pulse to input R1 of the first half of dual binary counter 100. As mentioned above, this prevents activation of the devices connected to output control circuits 38. Rain switch 154 can be connected to an OFF position, a MANUAL position, and an AUTO position, the last of which is in turn connected to moisture sensor 156. Moisture sensor 156 is simply a switch that is activated by moisture and when activated connects ground through rain switch 154 and through an inverter to effect the turning-on of transistor switch 158.

Figure 6:
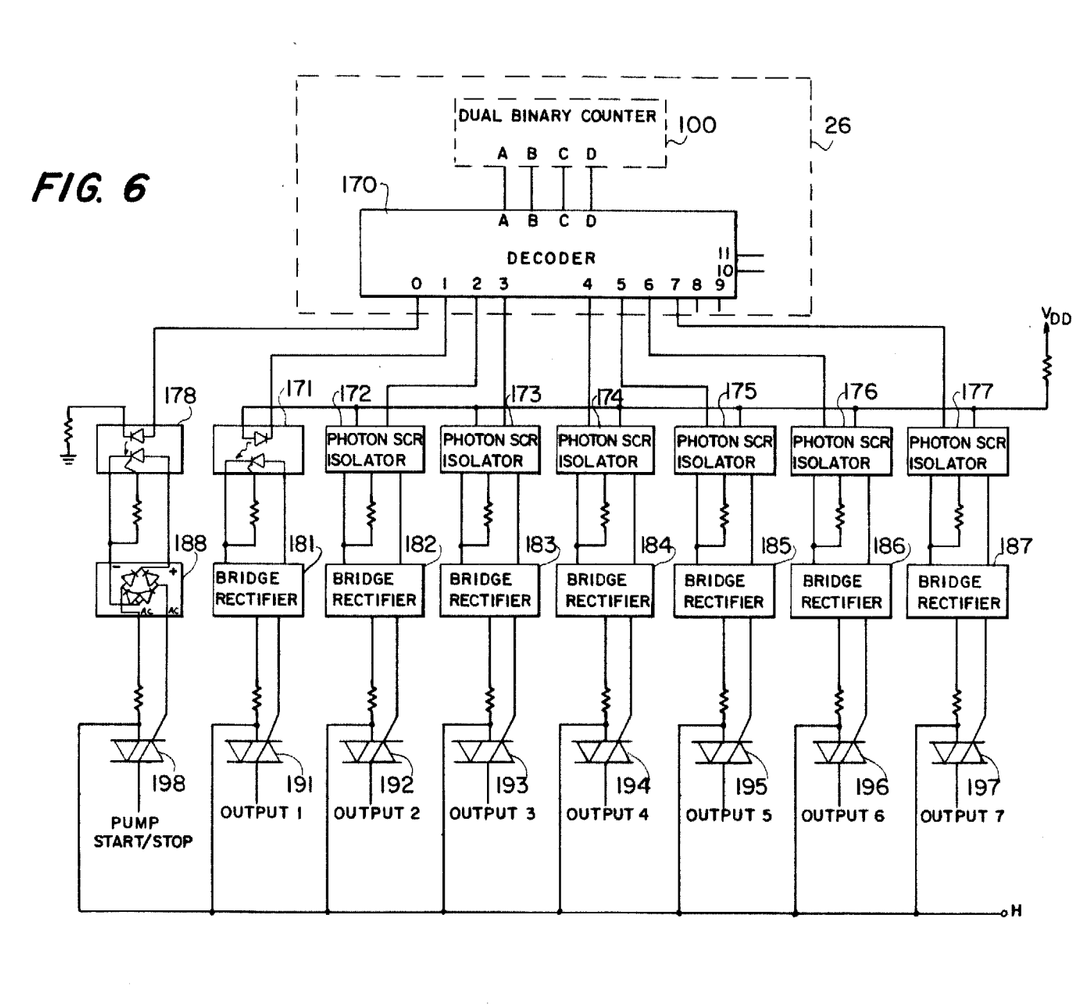
FIG. 6 is an electronic schematic circuit diagram, partially in block form, of the output control circuit of one embodiment of the present invention.

Output control circuits 38 are depicted in FIG. 6. The output from the first dual binary counter 100 is sent to a decoder 170, which can be the same decoder or the same type of decoder as decoder 102. The individual outputs from decoder 170 are connected to respective ones of photon SCR isolators 171 through 178. The output from each isolator is in turn coupled to a respective one of bridge rectifiers 181 through 188, which in turn are connected to respective ones of triac 191 through 198. The corresponding outputs of triac 191 through 197 are coupled to devices 1 through 7, which in an irrigation application, can be 7 sets of water valves.

Isolators 171 through 178 are commercially available circuits such as photon coupled isolator H11C3 manufactured by General Electric.

The isolator-rectifier-triac circuit depicted in FIG. 6 is a conventional AC relay switching circuit useful when 0 voltage switching is not required. The circuit simply comprises an SCR coupler in a bridge, using a high gate resistor directly across the line voltage. Such a circuit is disclosed in the *General Electric Optoelectronics Manual* at page 80.

The input diode of each proton SCR isolator is connected between a corresponding output of decoder 170 and $V_{DD}$. Thus, when decoder 170 applies an active-low output to the selected line, current flows through the isolator input diode, which emits radiation and in turn triggers the SCR into conducting. The conducting SCR in turn permits the activation of the corresponding triac.

Output stations 1 through 7 of output control circuits 38 are connected to the corresponding devices to be controlled. In the irrigation environment, these devices would simply be the solenoids of the water valves. The circuit as depicted in FIG. 6 also discloses an eighth control circuit connected to the control switch for a pump. However, the coupling diode is connected between ground and the output of decoder 170 such that this will trigger its corresponding SCR only when output 0 is not selected. In this way, the disclosed circuit is used to control the operation of the irrigation pump whenever any one of the irrigation valves are open.

Figure 7:
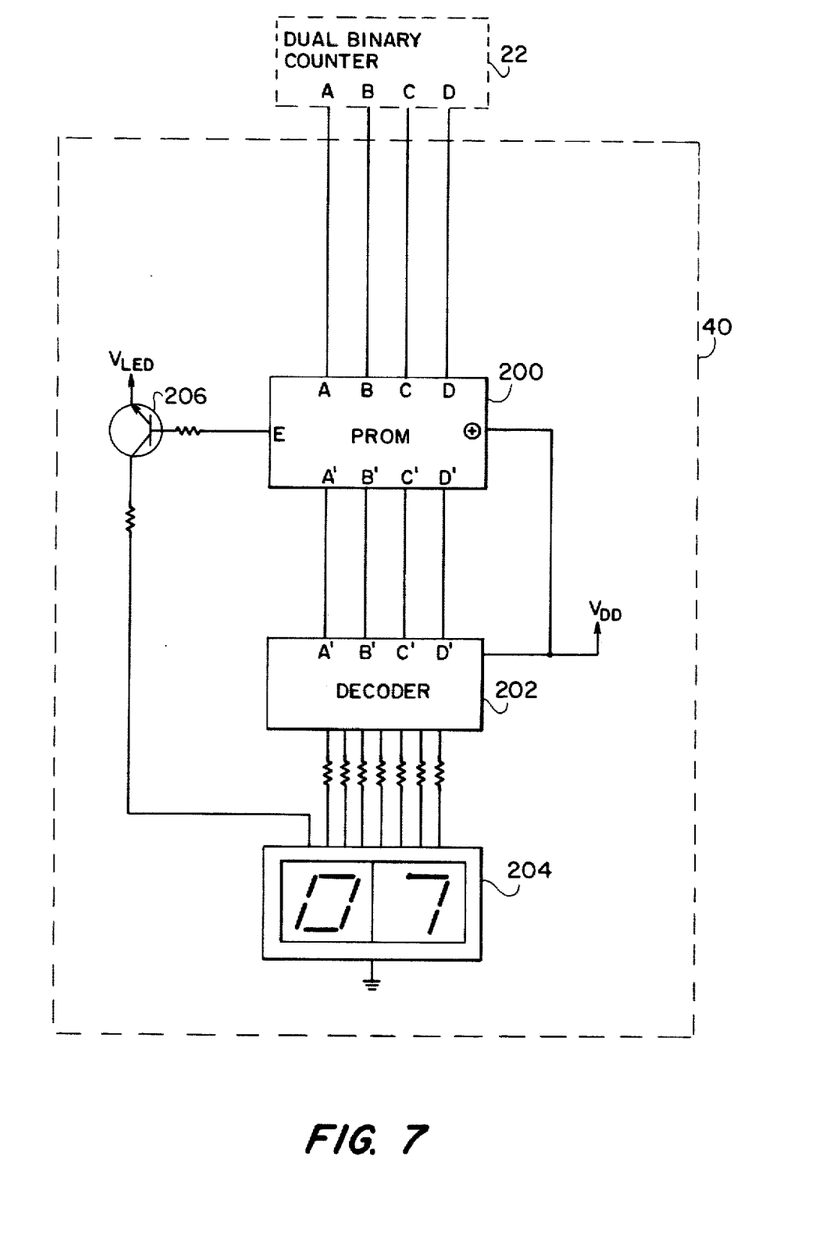
FIG. 7 is an electronic schematic block diagram of the selected output display depicted in block form in FIG. 1.

Referring now to FIG. 7, an exemplary detailed circuit of selected output display 40 is shown. Because it is possible for binary counter 100 to count to greater than 9, a PROM (programmable read only memory) is used to translate the output from second counter 22 to a form usable by the decoder 202 that controls a 7-segment LED display 204. PROM 200 can be a conventional TTL integrated circuit such as device #74S288 and decoder 202 can be a conventional BCD to 7-segment decoder commercially available as device CD4511BM manufactured by National Semiconductor.

The E output from PROM 200 is connected to the gate of a switching transistor 206 connected between $V_{LED}$ and the tens digit of display 204.

Obviously, the circuit depicted in FIG. 7 can be modified if more than sixteen devices are being controlled so as to indicate the number of the selected device.

The operation of the digital control system depicted in FIGS. 2–7 has been substantially described hereinabove. However, a brief summary of its operation will be set forth. Assuming the time is one minute before midnight and dual binary counter 100 is in the reset condition whereby the digits 0000 appear on outputs A,B,C, and D, decoder 102 will select the 0 output and assuming repeat switch 46 is in the non-repeat position, an inhibit pulse will be applied to voltage controlled oscillator 120 preventing it from providing an output signal. Exactly at midnight, clock device 60 provides an output signal at the AM output which is transmitted through isolator 70 and conditioned by multivibrator 76 to the Cl₂ input or the clock input of the second section of dual binary counter 100. This immediately provides the binary 1 at the output of the second section of binary counter 100. As shown in FIG. 5, this provides a select input to decoder 130 which then activates output number 1. Assuming switch 131 has been closed, this output is in turn transmitted through common line 150 to the reset R1 input of the first part of dual binary counter 100, thereby effectively enabling that counter. It must also be assumed at this point that rain sensor 156 has not been selected or if selected does not indicate any rain so as to provide an inhibiting pulse to the $R_1$ input.

The digital control system will remain in a quiescent state until the preprogrammed alarm time has been reached by clock device 60. At this time, the signal will be provided at the alarm output and will be coupled through isolator 74 through multivibrator 76 where the signal is conditioned to the count input of the first section of dual binary counter 100 causing that section to count to the number "1". The count of "1" is transmitted to decoder 102 (FIG. 4) where output line 1 is selected, to decoder 170 (FIG. 6) where output line 1 is selected, and to PROM 200 (FIG. 7) where the numeral 1 is caused to be displayed by display 204. With output 1 selected of decoder 170 (FIG. 6), the water pump will be turned on when the output signal at output 0 goes high and the first set of valves will be opened when the output signal at output 1 goes low. Decoder 102 (FIG. 4) provides an active low output signal at output 1 which activates station 1. Switch 111 at station 1 has been previously set to the first position connecting resistor R11 in the input circuit of voltage controlled oscillator 120. Therefore, voltage controlled oscillator 120 will provide a predetermined frequency of pulses to frequency divider 122. After a predetermined period of time depending upon the frequency of the output signal from voltage control oscillator 120, frequency divider 122 will provide an output at $Q_{12}$ which is transmitted to the clock input of the first section of binary counter 100 changing its count from 1 to 2. The same output from frequency divider 122 will reset the frequency divider to 0 and inhibit, temporarily, voltage controlled oscillator 120. As soon as the count in the first section of binary counter 100 changes, the selected output of decoder 170 (FIG. 6) will change thereby affecting the closing of those valves controlled by output 1 and opening those valves controlled by output 2.

The process continues until decoder 102 (FIG. 4) selects the 0 output. At this point, assuming repeat switch 46 is open, the process continues again as soon as a selected delay from switch 118 expires to cause yet another clocking pulse to be sent to the clock input of the first section of binary counter 100.

Figure 8:
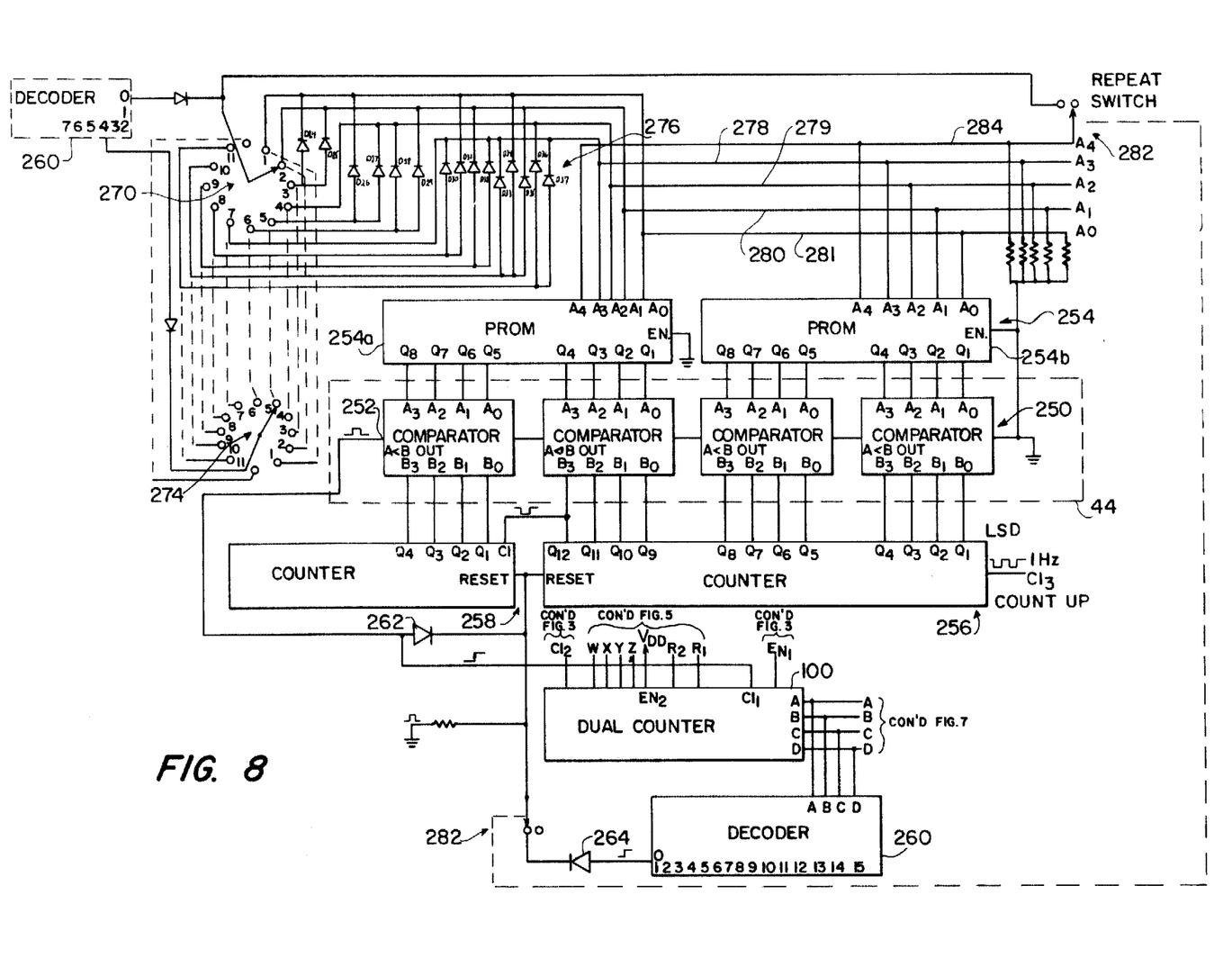
FIG. 8 is an electronic schematic circuit diagram of a second embodiment of the control logic and pulse generator depicted in FIG. 1 in block form.

A second embodiment of control logic 42 and pulse generator 44 is depicted in FIG. 8. In that particular embodiment, pulse generator 44 is comprised of a commercially available comparator 250 which is comprised of four stages. Each stage of comparator 250 can be a commercially available 4-bit magnitude comparator integrated circuit device #S5485 manufactured by Signetics. Each stage is coupled to the next stage between the A less than B input and output. Thus, whenever the word of A inputs has a value that is less than the value of the word of B inputs, comparator 250 will provide a signal at its output 252. Output 252 is connected to the $Cl_1$ clock input of the first stage of binary counter 100. Thus, whenever word A is less than word B, the count in the first stage of dual counter 100 will be increased.

Word A is provided by two preprogrammed PROM's 254. PROM's 254 can be commercially available, conventional bipolar tristate 256-bit PROMS available from National Semiconductor as device #DM74S288. An exemplary program of PROM's 254 is given in Table I.

The B word is provided by a counter 256 that can be comprised of two, serially connected, conventional counter stages such as frequency divider 122 described hereinabove. The count input of counter 256 is connected to isolator 68 (FIG. 3). Counter 256 has a reset input 258 which when held high resets counter 256 and prevents the counter from counting. In this way, a continuous stream of count pulses can be applied to the count or clock input thereof and counter 256 can be controlled by applying signals to reset input 258. As shown in FIG. 8, reset input 258 is connected to the 0 output of a decoder 260 which in turn is connected to the outputs of the first stage of dual counter 100. Decoder 260 is a commercially available decoder that provides an active-high output at the selected, decoded output such as device 4514. It is noted that for simplicity, decoder 260 is shown in two different places in FIG. 8. Comparator output 252 is also connected to counter reset input 258 so that counter 256 is also reset whenever an output signal is provided by comparator 250. Diodes 262 and 264 are respectively installed in the output lines from comparator 250 and decoder 260 so that these outputs can be tied together.

Control logic 42 comprises, in addition to PROM's 254 and counter 256 a plurality of individual, rotary single pole, multi-throw switches with only switches 270 and 274 being shown. Switches 270 and 274 can be substantially the same as switches 111 through 118. The inputs to each of the switches is connected to the corresponding output from decoder 260. Thus, output "0" has two connections thereto, a connection going to counter 256 and a connection going to switch 270. The corresponding outputs of all of the switches are connected in parallel together and in turn are connected to a diode encoder 276. Diode encoder 276 is a conventional diode circuit for encoding the decimal number to a binary number having four bits. Four output lines, 278, 279, 280 and 281, connect the output from diode encoder 276 to the address lines of PROM 254. A fifth address line connected to PROM 254 is connected through one-half of a double-pole, double-throw repeat switch 282 to the "0" output of decoder 260. The other half of repeat switch 282 is in the line connecting the "0" output of decoder 260 to counter reset input 258. ;p Functionally, the circuit as depicted in FIG. 8 operates similarly to the operation of the circuit depicted in the FIGS. 2-7. Initially, with the count in the first section of dual counter 100 being 0, and with the repeat switch in the nonrepeat position, decoder 260 will have an active-high output on output "0". This high signal will be transmitted through diode 264, blocked by diode 262, and transmitted to counter reset input 258, thereby inhibiting counter 256 from counting in response to the 1 Hertz input clock signal. In addition, as a result of switch 270, the high input from decoder output line "0" will be sent through diode encoder 276 to the address input of PROM 254. Whatever is stored in PROM 254 addressed by the output from encoder 276 will appear as the A word input to comparator 250. Because word A has a greater value than word B (word B value being 0 as a result of counter 256 being reset), there will be no output from comparator 250.

As described before, as soon as a clock pulse is delivered to the $E_{N1}$ input of dual counter 100 from clock device 50, the count in the first section of counter 100 will increase by 1 and decoder 260 will then cause output #1 thereof to go to the active-high state and change the output of output #0 to the inactive-low state. This removes the signal from counter reset input 258 permitting counter 256 to respond to the count up pulses applied to the clock input thereof. At the same time, a high output signal from decoder 260 output 1 is transmitted through a corresponding switch (not shown but for discussion purposes labelled 271) and thence through the selected output through diode encoder 276 to the address lines of PROM's 254. For exemplary purposes, PROMS 254 can be programmed as shown in Table I. If switch 271 is connected to switch output 3, lines 281 and 280 will go high and the other lines will remain tied low to ground. This produces the binary word 0011 from encoder 276. From Table I, binary address 0011 of PROM 254 produces on the output lines thereof and to the A input of comparator 250 the following: 0000 0000 from PROM 254a; and 1011 0100 from PROM 254b. This is the binary representation of the decimal number 180. Since counter 256 is being counted up at the rate of one pulse per minute, after 180 pulses the output from counter 256, that is, word B input to comparator 250, will equal the count from PROM 254 to comparator 250 as word A. The next pulse to counter 256 will make word B greater than word A producing a high output pulse from comparator output 252. As stated above, this is transmitted to the clock input of the first section of dual counter 100 causing it to count up from "1" to "2". This will continue until the count cycle in counter 100 completes the cycle and begins again thereby selecting the "0" output of decoder 260.

If repeat switch 282 is in the repeat position (opposite from that shown in FIG. 8), the high output pulse from output "0" of decoder 260 will be transmitted to the fifth address line 284 of PROM 254 causing a different number to be provided by PROM 254 at its output. Consequently, a different time delay can be provided. Counter 256 is able to count up since the second half of repeat switch 282 is in the open position thereby preventing an inhibit pulse from being delivered to the reset line of counter 256. After the programmed time delay, the cycle will begin all over again much in the same way as described hereinabove with respect to FIG. 4.

As described hereinabove, the devices connected to and controlled by output control circuits 38 are sequentially activated, one after another. However, if it is desired to have a delay between the activation of, for example, device 2 and device 3, this can also be easily accomplished. With reference to FIG. 6, all that need be done is to connect devices 1 and 2 to outputs 1 and 2 of decoder 170, skip output 3 of decoder 170, and connect the devices 3 and 4 to outputs 4 and 5 of decoder 170. Therefore, after the activation of device 2, there will be a time delay between the commencement of the activation of device 3 determined by the time delay selected by switch 113 (FIG. 4). The length of time with which device 3 will be activated will now be determined by the switch position of switch 114. Obviously, any arrangement can be selected.

In addition, if desirable, the number of repeat cycles can be limited. For example, an AND gate can be inserted between repeat switch 46 (FIG. 4) and transistor 126 and use the output of repeat switch 46 as one of its inputs. The other input can be from a programmable counter (e.g., 74192) through appropriate logic. The counter could then count the number of repeat cycles and provide a disable input to the AND gate. An appropriate reset signal would also have to be connected to the counter so that the repeat cycle could be initiated the following day.

Although the invention has been described in detail with respect to exemplary embodiments thereof, it will be understood by those of ordinary skill in the art that variations and modifications may be effected within the scope and spirit of the invention.

TABLE I

| PROM Address | PROM 254a | PROM 254b | Delay Time |
|---|---|---|---|
| $A_5A_4A_3A_2A_1$ | | | |
| 00000 | 0000 0000 | 0000 0000 | 1 SEC |
| 00001 | 0000 0000 | 0011 1100 | 1 MIN |
| 00010 | 0000 0000 | 0111 1000 | 2 MIN |
| 00011 | 0000 0000 | 1011 0100 | 3 MIN |
| 00100 | 0000 0001 | 0010 1100 | 5 MIN |
| 00101 | 0000 0001 | 1010 0110 | 7 MIN |
| 00110 | 0000 0010 | 0101 1000 | 10 MIN |
| 01000 | 0000 0100 | 1011 0000 | 20 MIN |
| 01001 | 0000 0110 | 0000 1000 | 30 MIN |
| 01010 | 0000 1001 | 0101 1110 | 40 MIN |
| 01011 | 0000 1011 | 1011 1000 | 50 MIN |
| 01100 | 0000 1110 | 0001 0000 | 60 MIN |
| 10000 | 0000 0000 | 0000 0000 | 1 SEC |
| 10001 | 0000 0001 | 0010 1100 | 5 MIN |
| 10010 | 0000 0010 | 0101 1000 | 10 MIN |
| 10011 | 0000 0011 | 1000 0100 | 15 MIN |
| 10100 | 0000 0100 | 1011 0000 | 20 MIN |
| 10101 | 0000 0110 | 0000 1000 | 30 MIN |
| 10110 | 0000 1001 | 0101 1110 | 40 MIN |
| 11000 | 0000 1011 | 1011 1000 | 50 MIN |
| 11001 | 0000 1110 | 0001 0000 | 60 MIN |
| 11010 | 0001 1100 | 0010 1010 | 120 MIN |
| 11011 | 0010 1010 | 0011 0000 | 180 MIN |
| 11100 | 0011 1000 | 0100 0000 | 140 MIN |

We claim:

1. An electronic controller for periodically controlling the operation of a plurality of devices comprising:
   a clock circuit means for providing at least a first timing pulse once a day at the same time at a first clock output thereof, and a second timing pulse at a preselected time at a second clock output thereof;
   a first counter means, having a first input connected to said first clock output and an output, for counting the input pulses and providing an output signal representative of the count therein at said output thereof;
   a second counter means, having a first input connected to said second clock output, a second input, a clock input for advancing the count in said second counter means, and an output, for counting the input pulses and providing an output signal at said output representative of the count therein;
   an output control circuit connected to said second counter means output and having a plurality of operating circuits each adapted to control the operation of a device and each selected and controlled in turn in a timed sequence based on the count in said second counter means;
   means for selectively applying the output signal of said first counter means based upon said first count to said second input of said second counter means for controlling the operation thereof; and
   means for providing a pulse to said clock input of said second counter means after a variable preselected time delay from the selection of the device, said provided pulse thereby advancing the count in said second counter and changing the selected control circuit.

2. An electronic controller as claimed in claim 1 and further including means for causing said timed sequence to repeat after the completion thereof.

3. An electronic controller as claimed in claim 1 and further including means responsive to rain for inhibiting the operation of the plurality of controlled devices when rain is detected.

4. An electronic controller as claimed in claim 1 and further including means for delaying the operation of the next device to be operated for a predetermined, selectable time delay after the operation of the previous device.

5. An electronic controller as claimed in claim 1 wherein said pulse providing means comprises a pulse generator, the output of which is connected to said clock input of said second counter means and control logic means for causing said pulse generator to produce an output, said control logic means comprising a plurality of time delay means and means for selecting a particular time delay means based on the count in said second counter means.

6. An electronic controller as claimed in claim 1 wherein said pulse providing means comprises a plurality of switch means corresponding to the number of devices being controlled so that the individual operation of each device can be separately determined, said switch means having a plurality of selectable outputs, a logic circuit connected to the outputs of said switch means for producing a first number signal; counter means connected to said clock for receiving periodic timing therefrom and for producing a second number signal; and comparator means for comparing said first and said second number signals and for producing an output signal at a predetermined comparison, said output signal being delivered to the clock input of said second counter means.

* * * * *